United States Patent [19]

Hartman

[11] Patent Number: 4,930,309
[45] Date of Patent: Jun. 5, 1990

[54] GAS COMPRESSOR FOR JET ENGINE

[75] Inventor: Neil W. Hartman, Tucson, Ariz.

[73] Assignee: Fleck Aerospace Limited Partnership, Brookfield, Wis.

[21] Appl. No.: 267,994

[22] Filed: Nov. 3, 1988

[51] Int. Cl.$^5$ .............................................. F02K 7/08
[52] U.S. Cl. ...................................... 60/267; 60/269; 60/270.1; 417/173
[58] Field of Search ............... 60/266, 267, 269, 220.1; 417/151, 173, 178

[56] References Cited

U.S. PATENT DOCUMENTS

| | | | |
|---|---|---|---|
| 2,920,448 | 1/1960 | Coanda | 60/269 |
| 3,323,304 | 6/1967 | Llobet et al. | 60/269 |
| 3,382,679 | 5/1968 | Spoerlein | 60/269 |
| 3,690,102 | 9/1972 | DuPont | 60/269 |
| 3,800,529 | 4/1974 | Sharpe | 60/269 |
| 4,644,746 | 2/1987 | Hartman | 60/269 |

Primary Examiner—Louis J. Casaregola
Attorney, Agent, or Firm—Lee, Mann, Smith, McWilliams & Sweeney

[57] ABSTRACT

A gas compressor is provided which can be utilized in a jet engine for propulsion of a flight vehicle at velocities ranging from static to very high Mach numbers. The jet engine includes a housing with an inlet, a mixing chamber in fluid communication with the inlet, a diffuser section in fluid communication with the mixing chamber, a combustion chamber in fluid communication with the diffuser section and an outlet in communication with the combustion chamber. Auxiliary gas injection nozzles located downstream of the mixing chamber direct a high velocity gas stream toward the outlet to induce a region of sufficiently low pressure within the mixing chamber to cause a supersonic flow of gas from the inlet section through the mixing chamber. Cryogenic fuel is injected into the mixing chamber to modify the stagnation enthalpy, pressure and temperature of the supersonic flow therethrough. Fuel is injected into the combustion chamber where the mixture of the compressed air flow from the diffuser and the fuel is ignited to produce thrust. The outlet is adjustable to provide the amount of back pressure required in the combustion chamber for stable operation.

18 Claims, 3 Drawing Sheets

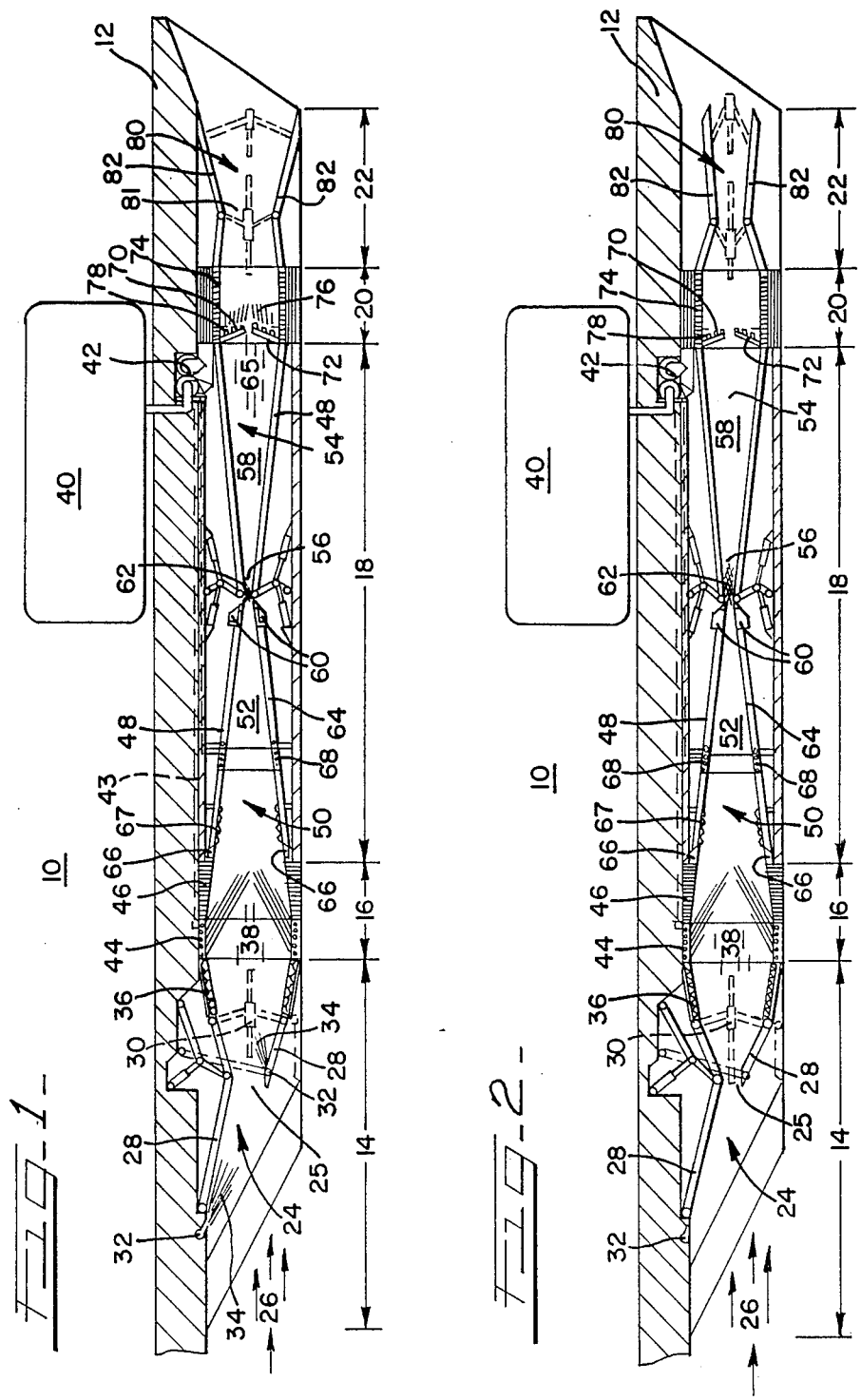

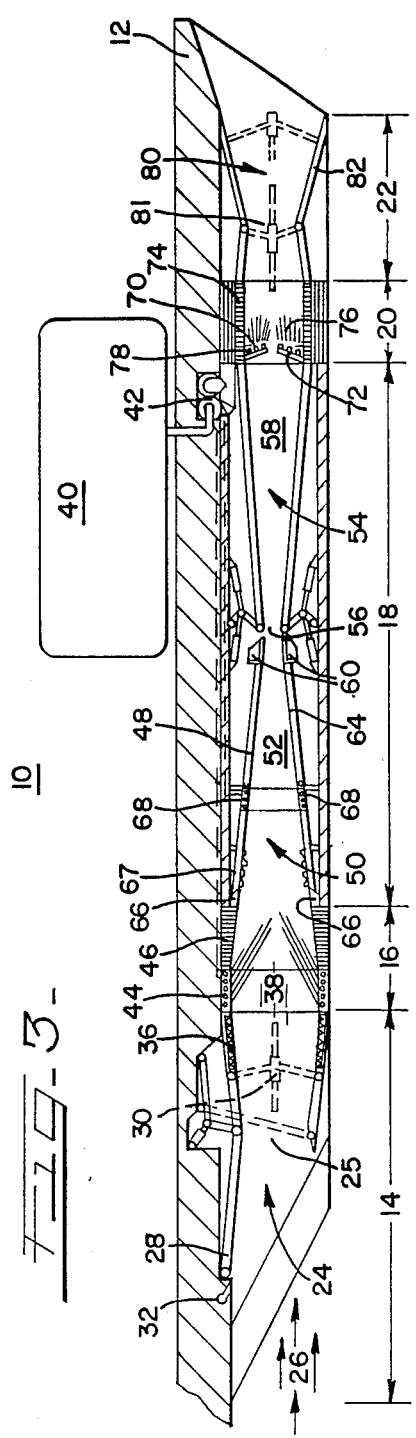

GAS COMPRESSOR FOR JET ENGINE

BACKGROUND OF THE INVENTION

The present invention is directed to gas compressors used in an aeropropulsion jet engine for propelling a vehicle by means of thrust generated by the engine. More particularly, it relates to a jet engine having a structure designated for operation at supersonic or hypersonic flight velocities.

The operation of conventional turbojet and turbofan engines at flight Mach numbers exceeding Mach 3.5 is severely constrained by limitations imposed on compressor outlet and turbine inlet temperatures. Ramjet engines, however, may be operated efficiently at flight velocities ranging from Mach 1.5 to Mach 6–7 above which dissociation effects prevent effective fuel utilization. Supersonic combustion ramjet engines (SCRAMJET) are potentially operable up to orbital velocities. Both types of ramjet engines suffer from major difficulties. No usable thrust is produced at flight velocities less than about Mach 0.8 for Ramjets and below Mach 4 for a Scramjet. Traditional methods of dealing with the problem use a secondary propulsion system, either expendable or reusable, to accelerate the vehicle to an appropriate starting velocity for the Ramjet or Scramjet. The use of a secondary propulsion system increases the weight and complexity of the engine and limits its operational flexibility. Typical of prior art arrangements are the devices disclosed in U.S. Pat. Nos. 2,920,448, 3,323,304, 3,374,631, 3,382,679, 3,750,400, 3,800,529, 3,800,531, 4,379,679 and applicant's patent 4,644,746. Also of some relevance is French Patent No. 2,534,983.

SUMMARY OF THE INVENTION

The present invention provides a gas compressor for the compression of atmospheric air or other gas and the introduction of that gas into the combustion chamber of a jet engine. The jet engine can be used for propulsion of a flight vehicle at velocities ranging from static to very high Mach numbers, without the use of secondary propulsion systems. The novel concept incorporated in this engine cycle is the use of cooling of a supersonic air stream to produce an increase in its stagnation pressure. Cooling is achieved by the injection of a liquid which is also used as the fuel in the combustion process. A mechanism located downstream of the mixing chamber is provided for inducing a region of sufficiently low pressure in the mixing chamber to cause a supersonic flow of gas through the compressor.

BRIEF DESCRIPTION OF THE DRAWINGS

FIG. 1 is a side cross-sectional view of the jet engine embodying the gas compressor of the present invention.

FIG. 2 is a side cross-sectional view of the engine in FIG. 1 in the start-up mode.

FIG. 3 is a side cross-sectional view of the engine in FIG. 1 in the take-off, subsonic, transonic or low supersonic acceleration mode.

FIG. 4 is a side cross-sectional view of the engine in FIG. 1 in the mode for operation at Mach numbers at or above the desired mixing chamber Mach number, but below the diffuser design Mach number.

DETAILED DESCRIPTION OF THE INVENTION

Figure 5:
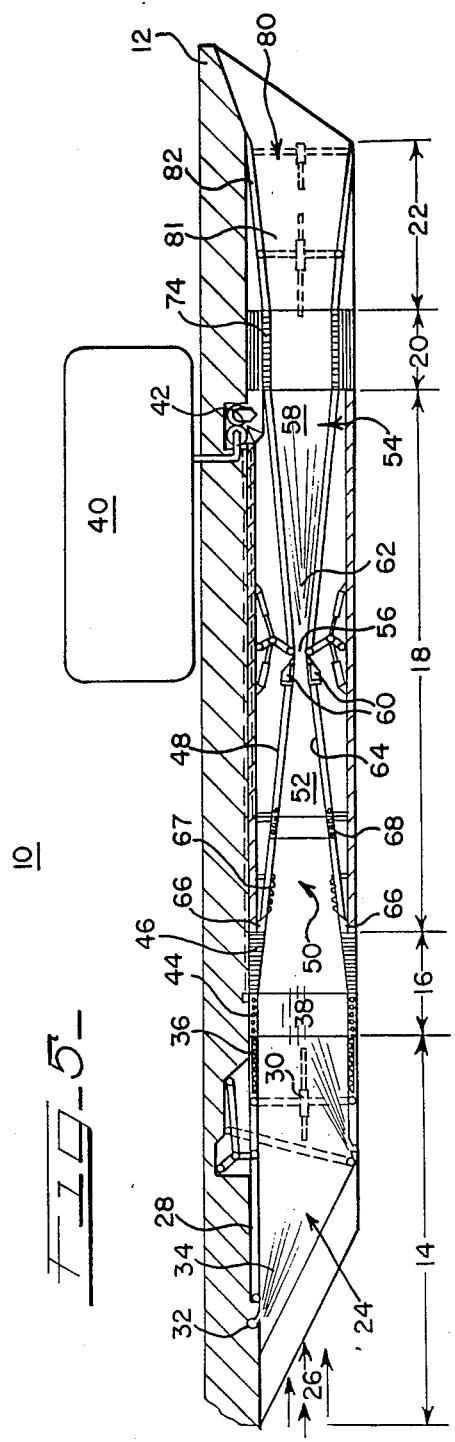
FIG. 5 is a side cross-sectional view of the engine in FIG. 1 in the mode for operation at Mach numbers greater than the diffuser design Mach number.

A jet engine, indicated generally by the numeral 10, is shown in FIGS. 1–5. A two dimensional structure is shown for convenience. The jet engine 10 includes a housing 12 with a passage extending the length of the housing 12. An inlet section 14 is located at one end of the housing 12. The inlet section 14 supplies air to a mixing chamber 16, a diffuser 18, a combustion chamber 20 and an outlet 22.

The inlet section 14 has a variable geometry converging-diverging nozzle 24 which controls the flow rate and velocity of an air stream 26 of inlet atmospheric air or other gas which enters through the nozzle 24. The nozzle 24 includes an inlet throat 25. The geometry of the inlet section 14 may be varied by the movement of wall panels 28 by a mechanism 30 which can be hydraulic, electrohydraulic, electromechanical, hydromechanical or pneumatic. The geometry may also be varied by translating centerbodies or other methods using the same aforementioned technologies.

A number of gas injection nozzles 32 are provided near the entrance to the inlet section 14 for the axial injection of a low molecular weight fuel gas 34, such as hydrogen or methane, into the inlet 14 during flight at high Mach numbers. The central axes of nozzles 32 are inclined at angles with respect to the central axis of the housing 12, generally between five and twenty-five degrees, to promote mixing. The injection pressure, injection angle, and nozzle contour are carefully selected to sufficiently match the velocity of the low molecular weight fuel 34 and the velocity of inlet air stream 26 in order to minimize shock formation. The gas injection nozzles 32 inject the gas 34 into the inlet section 14 or the mixing chamber 16 or both.

A cooling mechanism 36 located in the inlet section 14 may be provided to circulate fuel or other liquid or gaseous coolant through the walls 28 of the inlet section 14 to reduce the temperature of the walls 28 in order to provide structural durability and to prevent boundary layer growth. The cooling mechanism 36 may circulate coolant through the walls of mixing chamber 16, diffuser 18, combustion chamber 20, or outlet 22, as well as the inlet section 14 or any combination of these.

The mixing chamber 16 is located downstream from the inlet section 14 and is adapted to receive a flow of supersonic gas 38 from the inlet section 14. A source 40 of liquid such as cryogenic liquid hydrogen or methane, is communicated first to a pressure tank or pump 42, and then, at a pressure of between 500 and 20,000 pounds per square inch, through fuel line 43, to a plurality of nozzles 44 which inject the liquid 40 into the mixing chamber 16 with an axial velocity component in the direction of the outlet section 22. The internal shape of the nozzles 44 may be either straight or contoured, but the nozzles must have their central axes inclined at an angle of generally between five and forty-five degrees, inclusive, with respect to the central axis of the mixing chamber 16 in order to accomplish modification of stagnation enthalpy and pressure and temperature of gases in the mixing chamber 16. The vaporization of the liquid 40 reduces the stagnation temperature and enthalpy of the gases in the region by the removal of heat energy in the vaporization. This increases the Mach number and stagnation pressure of the flow.

A nuclear spin orientation mechanism 46 may be provided in the mixing chamber 16 to modify the nuclear spin orientation of some of the molecules therein. Orienting the nuclear spin of the molecules raises the molecules to a higher energy state, thereby modifying the stagnation enthalpy and removing heat energy from the mixing chamber 16 and lowering the stagnation temperature of the flow through the jet engine 10. This nuclear spin orientation may be accomplished by an external magnetic field and/or a radiation field within the mixing chamber 16. In this manner, the molecules of matter in the flow stream in this region may be shifted to higher energy levels, taking energy in the form of heat from the environment in the region and thus lowering the matter's stagnation temperature, thereby raising its stagnation pressure. If the nuclear spin orientation mechanism 46 is incorporated in the jet engine 10, it may be located in the mixing chamber 16 as shown in the illustrated embodiment or the mechanism 46 may be located in both the mixing chamber 16 and diffuser section 18 or in the diffuser section 18 only.

The diffuser section 18 is disposed downstream of the mixing chamber 16 and is a variable geometry diffuser of a generally converging-diverging shape. The wall panels 48 of the diffuser 18 may be moved in the same manner as described above for movement of the wall panels 28 of the variable geometry inlet section 14. The diffuser 18 includes a supersonic diffuser section 50 which defines a chamber 52 of decreasing cross-sectional area and a subsonic diffuser section 54 connected to the supersonic diffuser section 50 by a throat 56. The subsonic diffuser section 54 defines a chamber 58 of increasing cross-sectional area. At very high Mach numbers, the diffuser throat area would be increased to the degree that supersonic flow would be maintained throughout the total length of the diffuser, combustion chamber, and outlet sections.

Auxiliary gas injection nozzles 60 are provided in the supersonic diffuser section 50 of the diffuser 18. The nozzles 60 are shaped to inject and direct the flow of a high velocity gas stream 62 of moderate temperature toward the diffuser throat 56. The nozzles 60 may be mounted flush with a diffuser ramp 64 as shown in the illustrated embodiment, or on a retractable rake or on a centerbody permanently mounted in the flow stream through the passage. Said high velocity gas stream 62 is of sufficient capacity and character to drive the diffuser section 18 as an ejector while the inlet 14 is in the starting (very low mass flow rate) position producing a supersonic gas stream 38 through mixing chamber 16.

One or more nozzles 66 may also be provided to tangentially inject a small amount of high velocity gas 67 for boundary layer control along certain surfaces of the diffuser 18. The nozzles 66 direct the flow of the high velocity, low molecular weight gas 67 in a smoothly flowing sheet parallel to and adjacent to the diffuser surfaces. These nozzles also may be placed in the inlet section 14 and mixing chamber 16 or in any one or combination of these.

Auxiliary liquid injection nozzles 68, similar in all mechanical and fluid dynamic details to the liquid injection nozzles 44 described above, may be positioned at any point in the housing 12 between the inlet throat 25 and the diffuser throat 56. In the illustrated embodiment, they are shown in the supersonic diffuser section 50 of the diffuser 18.

What has been described so far is a gas compressor which is particularly useful in jet engines. The gas compression process is completed when the gas is decelerated in subsonic diffuser 54. The remaining structure which will be described includes the components of the jet engine to which the gas compressor may be connected.

The combustion chamber 20 is located downstream of and in fluid communication with the diffuser section 18. The combustion chamber 20 is also in communication with the outlet section 22. Fuel injection nozzles 70 may be supported by a flame holder 72 or mounted flush with the walls 74 of the combustion chamber 20 or on a rectractable rake. The fuel injection nozzles 70 direct the flow of fuel 76 which is communicated into the interior of the chamber 20. The fuel 76 may be communicated to the chamber 20 in liquid, gaseous or a mixed phase state. An ignition mechanism 78 is associated with the fuel injection nozzles 70 to ignite the combustible mixture of the inlet air 26 and the fuel in the combustion chamber 20 to produce thrust. The ignition mechanism 78 may utilize any of a number of methods well known in the art to achieve ignition, for example, pilot flames, sparks, or the injection of pyrophoric substances.

The outlet section 22 defines a variable geometry exhaust nozzle 80 of generally converging-diverging construction having a throat 81. As with the inlet section 14 and the diffuser section 18 the walls 82 of the exhaust nozzle 80 may be moved by any of several methods known in the art, several of which are listed above.

The operation of the jet engine of the present invention is as follows. FIG. 2 illustrates the engine in its start-up mode. The inlet section 14 is adjusted such that the area of the inlet throat 25 is relatively small compared to the configuration of FIG. 1, thereby restricting the mass flow of the inlet air stream 26 through the engine 10. The auxiliary gas injection nozzles 60 direct high velocity gas jets 62 toward the diffuser throat 56. The dimensions of the diffuser throat 56 have been adjusted by changing the position of the diffuser ramp 64 located in the supersonic diffuser section 50. This adjustment optimizes the ejector action generated to induce a region of sufficiently low pressure within the mixing chamber 16 to cause the air stream 26 entering the inlet throat 14 to attain a velocity having a supersonic Mach number as it flows into the mixing chamber 16. As the inlet stream 26 reaches supersonic velocity, the liquid 40 is injected by the liquid injector nozzle 44 into the resulting supersonic gas stream 38 flowing through the mixing chamber 16.

The injection of the liquid 40 is most effective if the axial velocity thereof has a magnitude near the velocity of the supersonic gas stream 38. An increase in the Mach number and stagnation pressure of the supersonic gas stream 38 is caused by the evaporation of the liquid 40. At the same time, the stagnation temperature decreases. The processes are driven by the latent heat vaporization and the low temperature of the liquid 40. A large portion of the increased stagnation pressure is recovered in the diffuser section 18 resulting in a large rise in static pressure.

Once the stagnation pressure is high enough to maintain the flow through the engine 10, the auxiliary gas injection nozzles 60 shut down. The resulting compressed gas stream 65 exits the diffusion section 18 and enters the combustion chamber 20. The flame holder 72 and ignition mechanism 78 ignite the fuel/air mixture and stabilize the combustion of the compressed fuel/air mixture. The exhaust nozzle throat 81 of the outlet section 22 is adjusted by movement of the nozzle ramps 82 to provide the pressure required in the combustion chamber 20 for stable combustion.

Operation of this engine in takeoff, subsonic, transonic, and low supersonic acceleration modes is basically similar. A representation of the engine configuration suitable for these flight conditions is found in FIG. 3 which shows the inlet throat 25 expanded from the position shown in FIG. 2. The mass flow rate through the engine is determined by the area of inlet throat 25 and the freestream conditions. Liquid 40 is added by the liquid injector nozzles 44 raising the Mach number and stagnation pressure of the supersonic gas 38 issuing from inlet section 14. A large portion of the stagnation pressure of the gas stream 38 is recovered in the diffuser section 18. The compressed gas stream 65 is then received in the combustion chamber 20 wherein the flame holder 72 and ignition system 78 are utilized to burn the compressed gas mixture. Additional fuel 76 may be injected at this point in either liquid or gaseous form if desired, via injection nozzles 70. The exhaust nozzle throat 81 and the cross-sectional area of exhaust nozzle 80 are adjusted to provide optimum thrust for the available gas conditions and altitude.

For flight at or above the desired mixing chamber inlet Mach number, the inlet throat 25 may be opened to the full cross section area of the mixing chamber 16, as seen in FIG. 4. In this mode, only enough liquid from the source 40 is injected into the mixing chamber 16 via the liquid injector nozzles 44 to match the flow Mach number of the supersonic gas stream to the design Mach number of the diffuser section 18. A large portion of the stagnation pressure of the gas stream is recovered in the diffuser section 18. The compressed gas stream 65 is then received in the combustion chamber 20 wherein the flame holder 72 and ignition system 78 are utilized to burn the compressed gas mixture. Any additional fuel 76 may be injected at this point, via injection nozzles 70 in either liquid or gaseous form. The exhaust nozzle throat 81 and exit area 86 of exhaust nozzle 80 are adjusted to provide optimum thrust for the available gas conditions and altitude.

FIG. 5 shows the engine 10 of the present invention adjusted for flight operation at velocities in excess of the diffuser design Mach number. The cross-sectional area of the exhaust nozzle throat 81 has been expanded from the position shown in FIG. 4 so that, instead of the converging-diverging arrangement of the outlet 22 shown in FIG. 4, the outlet of FIG. 5 is continuously diverging, illustrating the engine configuration required for supersonic combustion. In that mode, a sufficient quantity of hydrogen or other low molecular weight gas 34 is injected by the fuel injector nozzles 32 into the inlet section 14 to reduce the Mach number of the flow to the diffuser design Mach number. In order that the interaction of these gas streams does not generate shocks or conditions conducive to supersonic combustion, the injectant 34 must be introduced at moderate relative velocity with respect to the gas stream to be treated. There is attendant with this process a loss in stagnation pressure and a possible reduction in stagnation temperatures. The latter effect is due to the increase in specific heat of the gas stream and is only present if the injected gas has a lower stagnation temperature than the freestream conditions. The reduction in stagnation pressure may be seen as beneficial, as flight at hypersonic Mach numbers is characterized by excessive stagnation pressures. More obvious are the benefits associated with reducing the very high stagnation temperatures in this flight regime. At some point, depending upon the diffuser design Mach number chosen and the freestream conditions, the amount of injected gas 34 required to achieve the necessary Mach number reduction will exceed the stochiometric value, thereby resulting in decreased engine fuel economy. However, trade offs are possible through geometric variations of the diffuser throat 56 and the ramps 64. Also, at some point, the peak static temperatures within the combustion chamber 20 cause dissociation losses to become excessive, such that it becomes desirable to change from subsonic to supersonic combustion. For operation in this mode, the diffuser throat 56 and ramp 64 are adjusted so that the flow Mach number at diffuser throat 56 is supersonic, and the static temperature and pressure for the flow stream there are within limits suitable for supersonic combustion. The diverging portion 54 of diffuser section 18 now becomes part of a supersonic combustor. The combustion process may be initiated by the oblique shock waves near the diffuser throat 56. The exhaust nozzle throat 81 is adjusted to the full area of the combustion chamber 20.

It is understood that the invention embodied in the above described jet engine is in no way restricted to strictly symmetric or linear arrangements of components. This principle of the engine may be used to pump or compress fluids other than air, for purposes other than aeropropulsion, for either fixed or mobile applications.

Various features of this invention have been particularly shown and described in connection with the illustrated embodiment of the invention. However, it must be understood that these particular arrangements merely illustrate and that the invention is to be given its fullest interpretation within the terms of the appended claims.

What is claimed is:

1. A gas compressor including a housing defining a passage therethrough, said housing having an inlet and an outlet, both configurable in a generally converging-diverging shape, means to vary the configuration of said inlet, means to vary the configuration of said outlet, a mixing chamber in said housing located downstream of and in fluid communication with said inlet adapted to receive a flow of gas from said inlet, a source of liquid coolant, first liquid coolant injection means associated with said liquid coolant source and said mixing chamber adapted to inject said liquid coolant into said mixing chamber with an axial velocity component in the direction of said outlet to accomplish modification of stagnation enthalpy, pressure and temperature of gases in said mixing chamber, a diffuser in said housing disposed downstream of and in fluid communication with said mixing chamber, said diffuser including a supersonic diffuser section defining a chamber of decreasing cross-sectional area, a subsonic diffuser section defining a chamber of increasing cross-sectional area and a throat connecting said supersonic diffuser section and said subsonic diffuser section and low pressure inducing means located downstream of said mixing chamber for inducing a region of sufficiently low pressure within said mixing chamber to cause a supersonic flow of gas from said inlet through said mixing chamber.

2. A gas compressor as in claim 1 in which said means to vary the configuration of said inlet is further operative to adjustably vary the cross-sectional area thereof.

3. A gas compressor as in claim 1 in which said means to vary the configuration of said outlet is further operative to adjustably vary the cross-sectional area thereof.

4. A gas compressor as in claim 1 including means to vary the configuration of said diffuser to adjustably vary the cross-sectional area thereof.

5. A gas compressor as in claim 1 including means to tangentially inject a low molecular weight gas film along selected surfaces within said housing to control boundary layer growth in portions of said housing wherein said gas flow is supersonic.

6. A gas compressor as in claim 1 including means for communicating and circulating a liquid or gaseous fuel through the walls of selected portions of said housing to cool and to control boundary layer growth.

7. A gas compressor as in claim 1 including a second liquid coolant injection means for injecting liquid coolant into a region disposed upstream of said diffuser throat.

8. A gas compressor as in Claim 1 including means associated with said mixing chamber to modify the nuclear spin orientation of gas molecules in said mixing chamber to change the stagnation enthalpy and temperature of the gases in the mixing chamber.

9. A jet engine including a housing defining a passage therethrough, said housing having an inlet and an outlet, both configurable in a generally converging-diverging shape, means to vary the configuration of said inlet, means to vary the configuration of said outlet a mixing chamber in said housing located downstream of and in fluid communication with said inlet adapted to receive a flow of gas from said inlet, a source of light coolant, first liquid coolant injection means associated with said liquid coolant source and said mixing chamber adapted to inject said liquid coolant into said mixing chamber with an axial velocity component in the direction of said outlet to accomplish modification of stagnation enthalpy, pressure and temperature of gases in said mixing chamber, a diffuser in said housing disposed downstream of and in fluid communication with said mixing chamber, said diffuser including a supersonic diffuser section defining a chamber of decreasing cross-sectional area, a subsonic diffuser section defining a chamber of increasing cross-sectional area and a throat connecting said supersonic diffuser section and said subsonic diffuser section and low pressure inducing means located downstream of said mixing chamber for inducing a region of sufficiently low pressure within said mixing chamber to cause a supersonic flow of gas from said inlet through said mixing chamber, a combustion chamber in said housing disposed downstream of, and in fluid communication with, said subsonic diffuser section, said combustion chamber in communication with said outlet, a fuel source in communication with said combustion chamber, fuel injection means associated with said fuel source and said combustion chamber so as to inject fuel from said fuel source into said combustion chamber and ignition means associated with said combustion chamber adapted to ignite a combustible mixture of inlet air and liquid fuel in said combustion chamber to produce thrust.

10. A jet engine as in claim 9 in which said means to vary the configuration of said inlet is further operative to adjustably vary the cross-sectional area thereof to accommodate varying flight conditions.

11. A jet engine as in claim 9 in which said means to vary the configuration of said outlet is further operative to adjustably vary the cross-sectional area thereof to accommodate varying flight conditions.

12. A jet engine as in claim 9 including means to vary the configuration of said diffuser to adjustably vary the cross-sectional area thereof to accommodate varying flight conditions.

13. A jet engine as in claim 9 including means to inject low molecular weight gas into said inlet.

14. A jet engine as in claim 9 including means to inject low molecular weight gas into said mixing chamber.

15. A jet engine as in claim 9 including means to tangentially inject a low molecular weight gas film along selected surfaces within said housing to control boundary layer growth in portions of said housing wherein said gas flow is supersonic.

16. A jet engine as in claim 9 including means for communicating and circulating a liquid or gaseous fuel through the walls of selected portions of said housing to cool and to control boundary layer growth.

17. A jet engine as in claim 9 including a second liquid coolant injection means for injecting liquid coolant into a region disposed upstream of said diffuser throat.

18. A jet engine as in claim 9 including means associated with said mixing chamber to modify the nuclear spin orientation of gas molecules in said mixing chamber to change the stagnation enthalpy and temperature of the gases in the mixing chamber.

* * * * *